United States Patent
Filip et al.

(10) Patent No.: US 11,994,405 B2
(45) Date of Patent: May 28, 2024

(54) METHODS AND SYSTEMS FOR DETERMINING GEOGRAPHIC ORIENTATION BASED ON IMAGERY

(71) Applicant: Google LLC, Mountain View, CA (US)

(72) Inventors: Daniel Joseph Filip, San Jose, CA (US); Zhen Yang, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 85 days.

(21) Appl. No.: 16/978,374

(22) PCT Filed: Mar. 12, 2018

(86) PCT No.: PCT/US2018/021957
§ 371 (c)(1),
(2) Date: Sep. 4, 2020

(87) PCT Pub. No.: WO2019/172941
PCT Pub. Date: Sep. 12, 2019

(65) Prior Publication Data
US 2021/0041259 A1      Feb. 11, 2021

Related U.S. Application Data

(60) Provisional application No. 62/639,674, filed on Mar. 7, 2018.

(51) Int. Cl.
*G06V 20/56* (2022.01)
*G01C 21/28* (2006.01)
(Continued)

(52) U.S. Cl.
CPC ......... *G01C 21/3602* (2013.01); *G01C 21/28* (2013.01); *G06F 18/214* (2023.01);
(Continued)

(58) Field of Classification Search
None
See application file for complete search history.

(56) References Cited

U.S. PATENT DOCUMENTS

| | | |
|---|---|---|
| 9,802,599 B2 | 10/2017 | Abou-Nasr et al. |
| 9,953,243 B2 | 4/2018 | Hesch et al. |

(Continued)

FOREIGN PATENT DOCUMENTS

| | | |
|---|---|---|
| CN | 106032990 | 10/2016 |
| CN | 107270888 | 10/2017 |
| EP | 3223196 | 9/2017 |

OTHER PUBLICATIONS

Baatz, Georges, et al. "Leveraging 3D city models for rotation invariant place-of-interest recognition." International Journal of Computer Vision 96.3 (2012): 315-334. (Year: 2012).*

(Continued)

*Primary Examiner* — Sean M Conner
(74) *Attorney, Agent, or Firm* — DORITY & MANNING P.A.

(57) ABSTRACT

The present disclosure is directed to determining geographic orientation based at least in part on imagery. In particular, the methods and systems of the present disclosure can: receive data generated by a camera (118) and representing imagery that includes at least a portion of a physical real-world environment comprising the camera (118) and a travelway (312); and determine, based at least in part on the data and a machine-learning model, a geographic orientation of the camera (118) with respect to the travelway (312).

15 Claims, 7 Drawing Sheets

(51) Int. Cl.

| | |
|---|---|
| *G01C 21/36* | (2006.01) |
| *G06F 18/214* | (2023.01) |
| *G06T 7/80* | (2017.01) |
| *G06V 20/10* | (2022.01) |
| *H04N 23/698* | (2023.01) |

(52) U.S. Cl.
CPC ............... *G06T 7/80* (2017.01); *G06V 20/10* (2022.01); *G06V 20/176* (2022.01); *H04N 23/698* (2023.01); *G06T 2207/20081* (2013.01); *G06T 2207/30244* (2013.01)

(56) References Cited

U.S. PATENT DOCUMENTS

| | | | |
|---|---|---|---|
| 10,375,357 | B2 | 8/2019 | Wang et al. |
| 11,205,236 | B1* | 12/2021 | Smith ....................... G06N 3/08 |
| 2006/0244830 | A1 | 11/2006 | Davenport et al. |
| 2017/0186186 | A1* | 6/2017 | Yamaguchi ............... G06T 7/74 |
| 2017/0278014 | A1* | 9/2017 | Lessmann ............... G06T 7/269 |
| 2018/0045519 | A1 | 2/2018 | Ghadiok et al. |
| 2018/0357907 | A1* | 12/2018 | Reiley .................... G06V 20/10 |
| 2019/0009777 | A1* | 1/2019 | Cheng ............... B60W 30/0956 |
| 2019/0057314 | A1* | 2/2019 | Julian ...................... H04L 67/34 |
| 2019/0130216 | A1* | 5/2019 | Tomioka ............... G06F 18/214 |
| 2019/0279329 | A1* | 9/2019 | Tang ....................... G06T 7/001 |

OTHER PUBLICATIONS

Madsen, Claus B., and Brajesh B. Lal. "Estimating outdoor illumination conditions based on detection of dynamic shadows." Computer Vision, Imaging and Computer Graphics. Theory and Applications: International Joint Conference, VISIGRAPP 2011, Vilamoura, Portugal, Mar. 5-7, 2011. Springer, 2013 (Year: 2013).*

International Preliminary Report on Patentability for Application No. PCT/US2018/021957, dated Sep. 17, 2020, 13 pages.

Bai et al, "A Sensor Fusion Framework Using Multiple Particle Filters for Video-Based Navigation", Intelligent Transportation Systems, vol. 11, No. 2, Jun. 2010, 11 pages.

Search Report for PCT/US2018/021957, dated Jan. 18, 2019, 5 pages.

Caulfield, "Direction of Camera Based on Shadows", Proceedings of the Irish Machine Vision and Image Processing Conference, 2003, 56 pages.

Li et al., "How many images can tell you the direction: A new method of navigation based on images" 2016 International Conference on Machine Learning and Cybernetics (ICMLC), vol. 2, 2016, pp. 1031-1036.

Chinese Search Report Corresponding to Application No. 2018800908821 on Dec. 13, 2023.

* cited by examiner

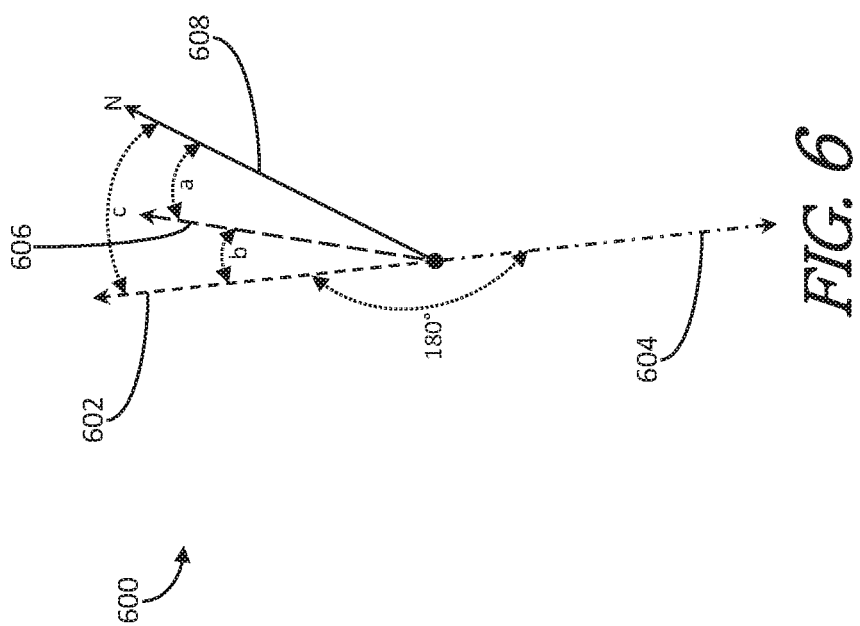

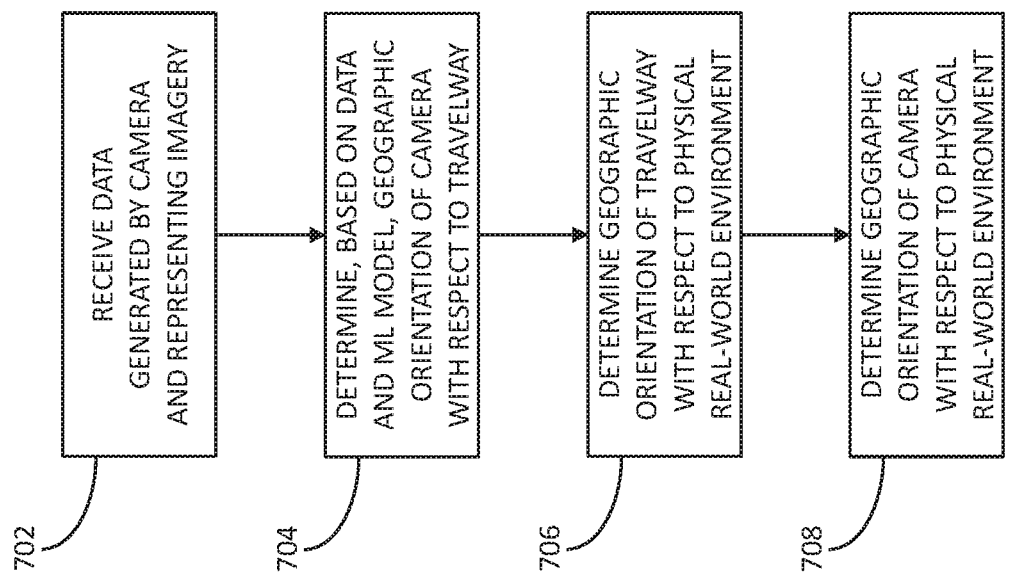

METHODS AND SYSTEMS FOR DETERMINING GEOGRAPHIC ORIENTATION BASED ON IMAGERY

PRIORITY CLAIM

This application is based upon and claims the right of priority under 35 U.S.C. 371 to International Application No. PCT/US2018/021957 filed on Mar. 12, 2018, and entitled which "METHODS AND SYSTEMS FOR DETERMINING GEOGRAPHIC ORIENTATION BASED ON IMAGERY," which claims priority to U.S. Patent Application Ser. No. 62/639,674, filed Mar. 7, 2018, and entitled "METHODS AND SYSTEMS FOR DETERMINING GEOGRAPHIC ORIENTATION BASED ON IMAGERY". Applicant claims priority to and the benefit of each of such applications and incorporate all such applications herein by reference in its entirety.

FIELD

The present disclosure relates generally to determining geographic orientation. More particularly, the present disclosure relates to determining geographic orientation based at least in part on imagery.

BACKGROUND

Mobile computing devices (e.g., smartphones, tablet computers, and/or the like) are ubiquitous and often include a panoply of sensors (e.g., cameras, global positioning system (GPS) receivers, proximity sensors, ambient-light sensors, accelerometers, magnetometers, gyroscopic sensors, radios, fingerprint sensors, barometers, facial-recognition sensors, and/or the like). Many modern mobile computing devices can accurately determine their geographic location (e.g., based on data generated by GPS receivers, received via wireless-network interfaces, and/or the like). Accurately determining geographic orientation of mobile devices, however, remains an intractable challenge. For example, while it is possible to determine geographic orientation based on data received via GPS receivers, such determinations are often inaccurate, particularly when the device is stationary and/or subject to interference from surrounding structures (e.g., located in an "urban canyon," and/or the like). Similarly, while geographic orientation can be determined using magnetometers, such determinations are frequently imprecise or erroneous because the devices themselves can interfere with magnetometers.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by a computing system, data generated by a camera and representing imagery that includes at least a portion of a physical real-world environment comprising the camera and a travelway. The method can also include determining, by the computing system and based at least in part on the data and a machine-learning model, a geographic orientation of the camera with respect to the travelway.

Another example aspect of the present disclosure is directed to a system. The system can include one or more processors and a memory storing instructions that when executed by the one or more processors cause the system to perform operations. The operations can include receiving data generated by a camera and representing imagery that includes at least a portion of a physical real-world environment comprising the camera and a travelway. The operations can also include determining, based at least in part on the data and a machine-learning model, two possible geographic orientations of the camera with respect to the travelway, the two possible geographic orientations differing by one hundred and eighty degrees. The operations can further include selecting, from amongst the two possible geographic orientations, a geographic orientation of the camera with respect to the travelway.

A further example aspect of the present disclosure is directed to one or more non-transitory computer-readable media. The one or more non-transitory computer-readable media can comprise instructions that when executed by one or more computers cause the one or more computers to perform operations. The operations can include receiving data generated by a camera and representing imagery that includes at least a portion of a physical real-world environment comprising the camera and a travelway having a known orientation with respect to the physical real-world environment. The operations can also include determining, based at least in part on the data and a machine-learning model, a geographic orientation of the camera with respect to the travelway. The operations can further include determining, based at least in part on the geographic orientation of the camera with respect to the travelway and the known orientation of the travelway with respect to the physical real-world environment, a geographic orientation of the camera with respect to the physical real-world environment.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts example orientations according to example embodiments of the present disclosure; and FIG. 7 depicts an example method according to example embodiments of the present disclosure.

DETAILED DESCRIPTION

Figure 1:
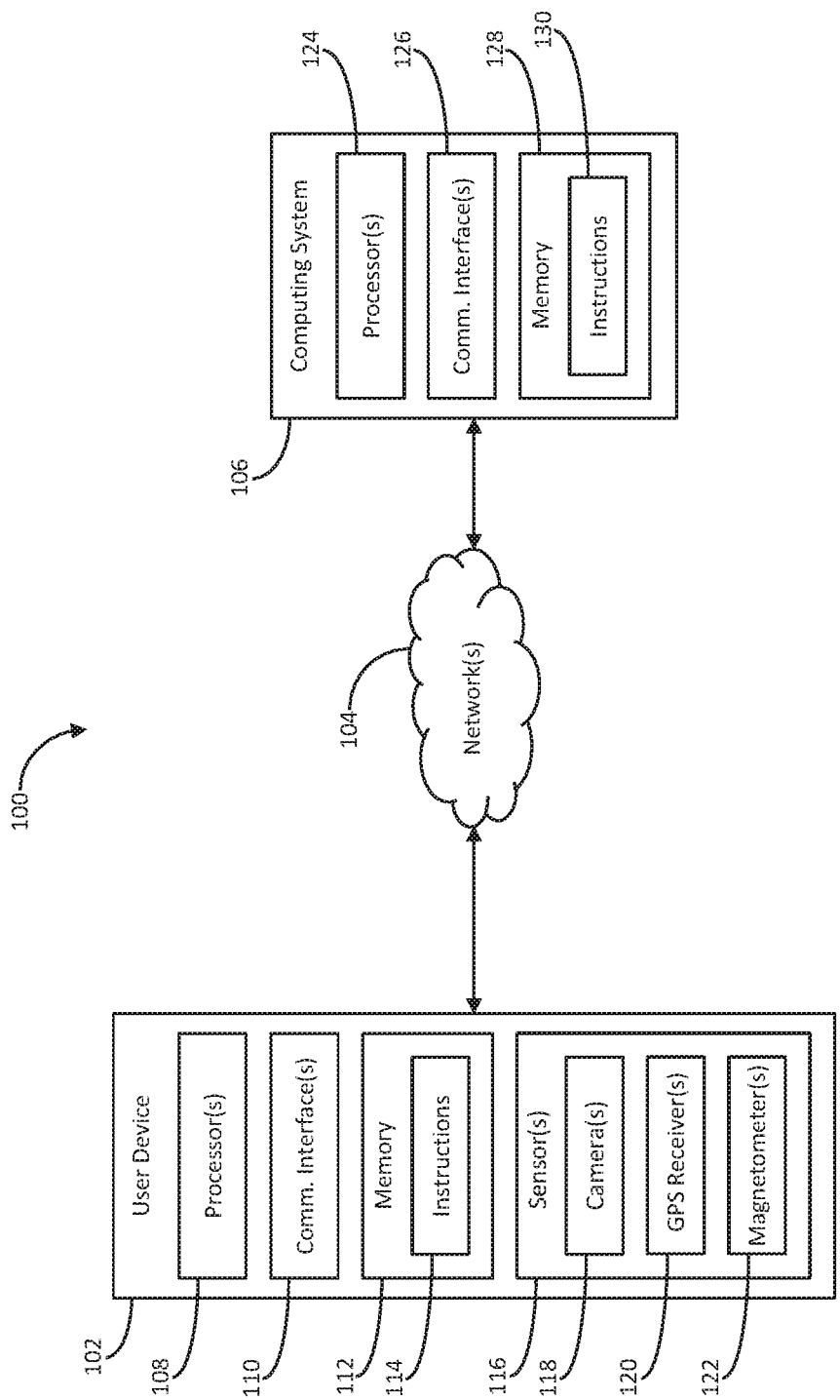
FIG. 1 depicts an example computing environment according to example embodiments of the present disclosure.

Example aspects of the present disclosure are directed to determining geographic orientation based at least in part on imagery. In particular, a physical real-world environment can include a travelway. A travelway can include, for example, a street, road, avenue, lane, boulevard, highway, freeway, parkway, railway tracks, and/or the like, with or without one or more adjacent sidewalks, walkways, paths, curbs, shoulders, and/or the like. A user located in the environment can utilize a camera of a user device (e.g., a camera system, mobile computing device, smartphone, wearable device, and/or the like) to generate data representing imagery that includes at least a portion of the environment. In accordance with aspects of the disclosure, a computing system (e.g., the user device, a computing system remotely located from the user device, and/or the like) can receive such data and can determine, based at least in part on the data and a machine-learning model, a geographic orientation of the camera (e.g., the camera, the user device, the user, and/or the like) with respect to the travelway.

In some embodiments, a geographic orientation of the travelway with respect to the environment (e.g., with respect to the world, magnetic north, and/or the like) can be known, predetermined, determined by the computing system, and/or the like. In some of such embodiments, the computing system can determine, based at least in part on the geographic orientation of the camera with respect to the travelway and the geographic orientation of the travelway with respect to the environment, a geographic orientation of the camera (e.g., the camera, the user device, the user, and/or the like) with respect to the environment (e.g., with respect to the world, magnetic north, and/or the like).

In some embodiments, the computing system can determine (e.g., based at least in part on the data representing the imagery, the machine-learning model, and/or the like) two possible geographic orientations of the camera with respect to the travelway, which can differ by one hundred and eighty degrees. For example, the computing system can determine the camera is facing directly up or down the travelway (e.g., oriented at a zero-degree angle or one-hundred-eighty-degree angle with respect to the travelway), perpendicular to the travelway one way or the other (e.g., oriented at a ninety-degree angle or two-hundred-seventy-degree angle with respect to the travelway), askew to the travelway one way or the other (e.g., oriented at a forty-five-degree angle or two-hundred-twenty-five-degree angle with respect to the travelway), and/or the like. In some of such embodiments, the computing system can select the geographic orientation of the camera with respect to the travelway from amongst the two possible geographic orientations.

In some embodiments, the computing system can select the geographic orientation of the camera with respect to the travelway based at least in part on illumination variance in the imagery. For example, the computing system can determine (e.g., based at least in part on illumination variance in the imagery, and/or the like) a position of a light source (e.g., the sun, the moon, an artificial-light source, and/or the like) in the environment with respect to the camera; an orientation of the light source with respect to the travelway can be known, predetermined, determined by the computing system, and/or the like; and the computing system can select the geographic orientation of the camera with respect to the travelway based at least in part on the position of the light source with respect to the camera, the orientation of the light source with respect to the travelway, and/or the like. In some of such embodiments, the computing system can select the geographic orientation of the camera with respect to the travelway based at least in part on a time at which the camera generated the data representing the imagery. For example, such data can include a timestamp indicating a time at which the camera generated the data representing the imagery, and the computing system can determine the orientation of the light source with respect to the travelway based at least in part on the time at which the camera generated the data representing the imagery, and/or the like.

In some embodiments, the computing system can identify, in the imagery, at least a portion of a building, different travelway, and/or the like. In some of such embodiments, the computing system can select the geographic orientation of the camera with respect to the travelway based at least in part on the at least a portion of the building, different travelway, and/or the like. For example, the computing system can determine (e.g., based at least in part on the imagery, and/or the like) a position of the at least a portion of the building, different travelway, and/or the like with respect to the camera; an orientation of the at least a portion of the building, different travelway, and/or the like with respect to the travelway can be known, predetermined, determined by the computing system, and/or the like; and the computing system can select the geographic orientation of the camera with respect to the travelway based at least in part on the position of the at least a portion of the building, different travelway, and/or the like with respect to the camera, the orientation of the at least a portion of the building, different travelway, and/or the like with respect to the travelway, and/or the like.

In some embodiments, the computing system can recognize, in the imagery, text associated with the at least a portion of the building, different travelway, and/or the like. For example, signage on the building can include text indicating a street address of the building, a name of an organization associated with the building, and/or the like. Similarly, signage can include text indicating a name of the different travelway, and/or the like. In some of such embodiments, the computing system can identify the at least a portion of the building, different travelway, and/or the like based at least in part on the recognized text. For example, the computing system can store, access, and/or the like a database including information indicating street addresses of buildings, street addresses of organizations, organization names, travelway names, associations between one or more portions of the information, and/or the like; and the computing system can identify the at least a portion of the building, different travelway, and/or the like based at least in part on identifying one or more entries in the database that include at least a portion of the recognized text, and/or the like.

In some embodiments, the user device can include a wireless-network interface, one or more sensors in addition to the camera, for example, a magnetometer, a global positioning system (GPS) receiver, and/or the like. In some of such embodiments, the computing system can determine, based at least in part on data generated by the wireless-network interface, additional sensor(s), and/or the like, a geographic orientation of the user device with respect to the environment (e.g., with respect to the world, magnetic north, and/or the like); and the computing system can select the geographic orientation of the camera with respect to the travelway based at least in part on the determined geographic orientation of the user device with respect to the environment.

In some embodiments, the computing system can determine (e.g., based at least in part on data generated by the wireless-network interface, additional sensor(s), and/or the like) a geographic location of the camera, the user device, the user, and/or the like. In some of such embodiments, the computing system can identify the travelway based at least in part on the geographic location of the camera, the user device, the user, and/or the like. Additionally or alternatively, the computing system can determine a geographic orientation of the travelway with respect to the environment based at least in part on the geographic location of the camera, the user device, the user, and/or the like.

In some embodiments, the computing system can select, based at least in part on the determined geographic location of the camera, the user device, the user, and/or the like, the machine-learning model from amongst multiple different machine-learning models for determining geographic orientations of cameras with respect to travelways. Such models can be based at least in part on training data comprising imagery from different corresponding geographic regions, and the selected model can be based at least in part on training data comprising imagery from a geographic region comprising the determined geographic location of the camera, the user device, the user, and/or the like. In some of such embodiments, the imagery from such geographic region need not include imagery that comprises the travelway.

In some embodiments, the machine-learning model can be based at least in part on training data cropped from panoramic imagery generated by a camera mounted on a vehicle. Such a vehicle can include one or more sensors (e.g., magnetometers, GPS receivers, and/or the like) for determining a geographic orientation of the camera mounted on the vehicle with respect to a travelway upon a portion of which the vehicle is traveling while the camera mounted on the vehicle captures the panoramic imagery, a physical real-world environment comprising the vehicle and the travelway upon the portion of which the vehicle is traveling, and/or the like. For each image of the images, such training data can include a geographic orientation of the image with respect to a travelway upon a portion of which the vehicle was traveling when the camera mounted on the vehicle captured panoramic imagery from which the image was cropped. For example, such a geographic orientation of the image can be determined based at least in part on data generated by the sensor(s) of the vehicle when the camera mounted on the vehicle captured the panoramic imagery from which the image was cropped.

In some embodiments, the computing system can communicate, to an application, data based at least in part on the geographic orientation of the camera with respect to the travelway, the environment, and/or the like. Such an application can include, for example, a geographic-mapping application, a geographic-navigation application, an augmented reality (AR) application, and/or the like. For example, the computing system can receive a request for such data made by the application via an application programming interface (API), and/or the like, and the computing system can communicate (e.g., return, and/or the like) the data to the application via the API, and/or the like.

The operations, functions, and/or the like described herein can be performed by the user device, a computing system remotely located from the user device, a combination of the user device and the computing system remotely located from the user device, and/or the like. For example, in some embodiments, the user device can locally receive (e.g., from the camera, and/or the like) the data representing the imagery, can locally determine the geographic orientation(s), and/or the like. Additionally or alternatively, a computing system remotely located from the user device can receive (e.g., via one or more networks, and/or the like) the data representing the imagery from the user device, can determine the geographic orientation(s), and/or the like.

The methods and systems described herein can provide a number of technical effects and benefits. For example, the methods and systems described herein can enable a computing system to accurately and efficiently determine an orientation of a camera, user device, user, and/or the like with respect to their environment. In particular, because the camera, data representing the imagery, and methodologies described herein for determining an orientation with respect to a travelway are typically not subject to interference (e.g., magnetic interference, radio interference, and/or the like) from the user device, the environment, and/or the like, the methods and systems described herein can enable a computing system to determine an orientation of a camera, user device, user, and/or the like with respect to their environment more efficiently and accurately than conventional approaches, which are often susceptible to such interference, and/or the like.

With reference now to the Figures, example embodiments of the present disclosure will be discussed in further detail.

FIG. 1 depicts an example computing environment according to example embodiments of the present disclosure. Referring to FIG. 1, environment 100 can include user device 102, one or more networks 104, and computing system 106. Network(s) 104 (e.g., one or more wired networks, wireless networks, and/or the like) can interface user device 102 and computing system 106.

User device 102 can include one or more devices cable of performing one or more of the operations, functions, and/or the like described herein, for example, a camera system, laptop computing device, desktop computing device, mobile computing device, tablet computing device, smartphone, media device, wearable device, a combination of one or more of such devices, and/or the like. User device 102 can include one or more processors 108, communication interfaces 110, sensors 116, and memory 112 (e.g., one or more hardware components for storing executable instructions, data, and/or the like). Communication interface(s) 110 can enable user device 102 to communicate (e.g., via network(s) 104, and/or the like) with computing system 106. For example, network(s) 104 can include one or more wireless networks, and communication interface(s) 110 can include one or more wireless-network interfaces configured to enable user device 102 to communicate (e.g., via the wireless network(s) of network(s) 104, and/or the like) with computing system 106. Sensor(s) 116 can include one or more devices configured to generate data based at least in part on a physical real-world environment in which user device 102 is located. For example, sensor(s) 116 can include one or more cameras 118, global positioning system (GPS) receivers 120, magnetometers 122, and/or the like. Memory 112 can include (e.g., store, and/or the like) instructions 114, which when executed by processor(s) 108, can cause user device 102 to perform one or more operations, functions, and/or the like described herein.

Computing system 106 can be remotely located from user device 102 and can include one or more devices cable of performing one or more of the operations, functions, and/or the like described herein, for example, a desktop computing device, a server, a mainframe, a combination of one or more of such devices, and/or the like. Computing system 106 can include one or more processors 124, communication interfaces 126, and memory 128 (e.g., one or more hardware components for storing executable instructions, data, and/or the like). Communication interface(s) 126 can enable computing system 106 to communicate (e.g., via network(s) 104, and/or the like) with user device 102. Memory 128 can include (e.g., store, and/or the like) instructions 130, which when executed by processor(s) 124, can cause computing system 106 to perform one or more operations, functions, and/or the like described herein.

Irrespective of attribution described or implied herein, unless explicitly indicated otherwise, the operations, functions, and/or the like described herein can be performed by user device 102 and/or computing system 106 (e.g., by user device 102, by computing system 106, by a combination of user device 102 and computing system 106, and/or the like).

Figure 2:
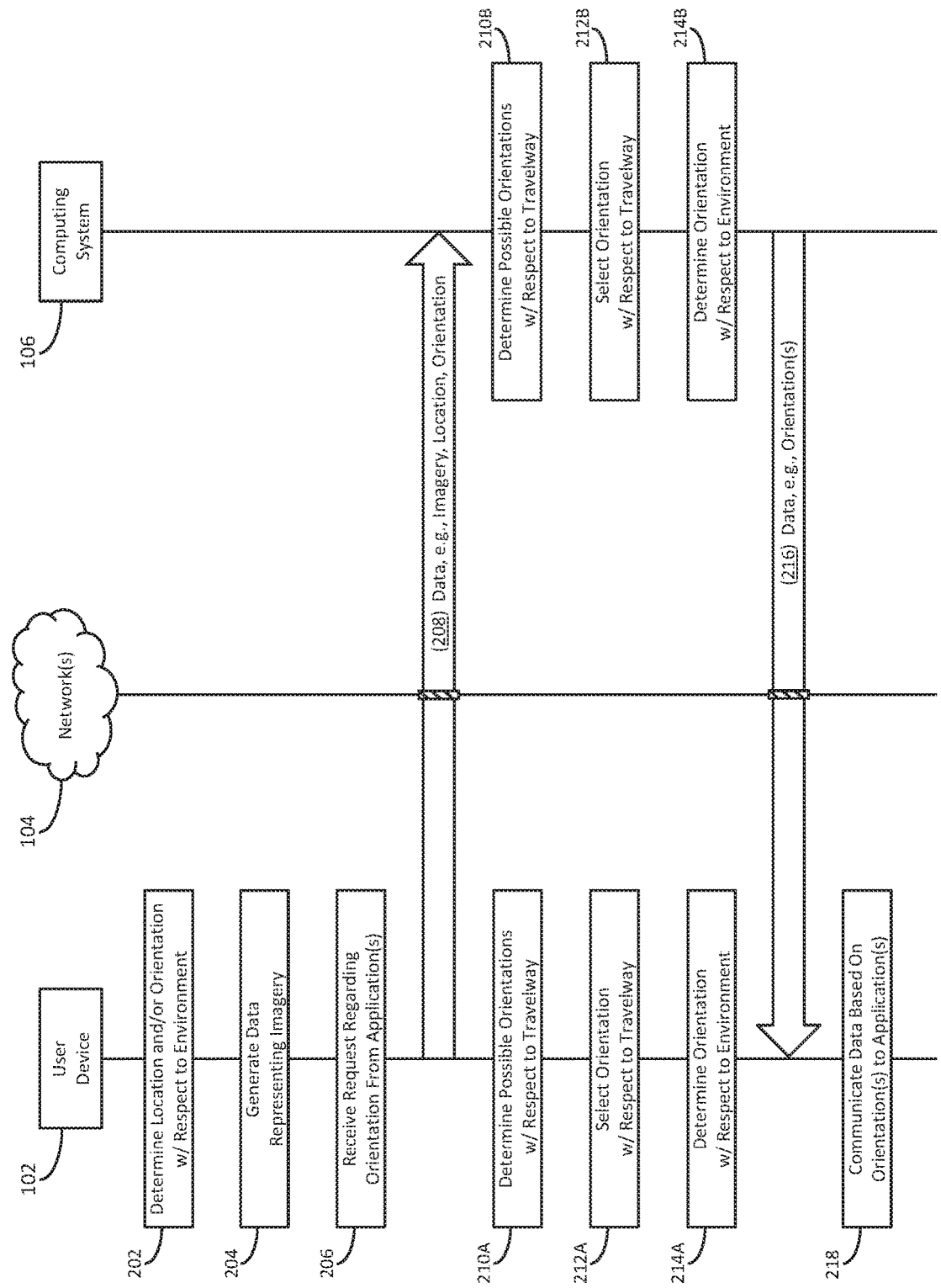
FIG. 2 depicts an example event sequence according to example embodiments of the present disclosure.

FIG. 2 depicts an example event sequence according to example embodiments of the present disclosure. Referring to FIG. 2, at (202), user device 102 can determine its geographic location within a physical real-world environment, its geographic orientation with respect to such environment, and/or the like.

In some embodiments, user device 102 can determine its geographic location, orientation, and/or the like based at least in part on data generated by communication interface(s) 110, sensor(s) 116, and/or the like. For example, user device 102 can determine its geographic location, orientation, and/or the like based at least in part on data generated by a wireless-network interface of communication interface(s) 110 (e.g., indicating a position, orientation, and/or the like of user device 102 with respect to one or more radio-signal sources for which locations, orientations, and/or the like are known), GPS receiver(s) 120 (e.g., indicating a position, orientation, and/or the like of user device 102 with respect to one or more satellite-signal sources for which locations, orientations, and/or the like are known), and/or magnetometer(s) 122 (e.g., indicating a position, orientation, and/or the like of user device 102 with respect to one or more magnetic-field sources for which locations, orientations, and/or the like are known). It will be appreciated that such determinations are estimates, not absolutes. It will further be appreciated that with respect to geographic orientation, such estimations can be inaccurate, imprecise, erroneous, and/or the like.

Figure 3:
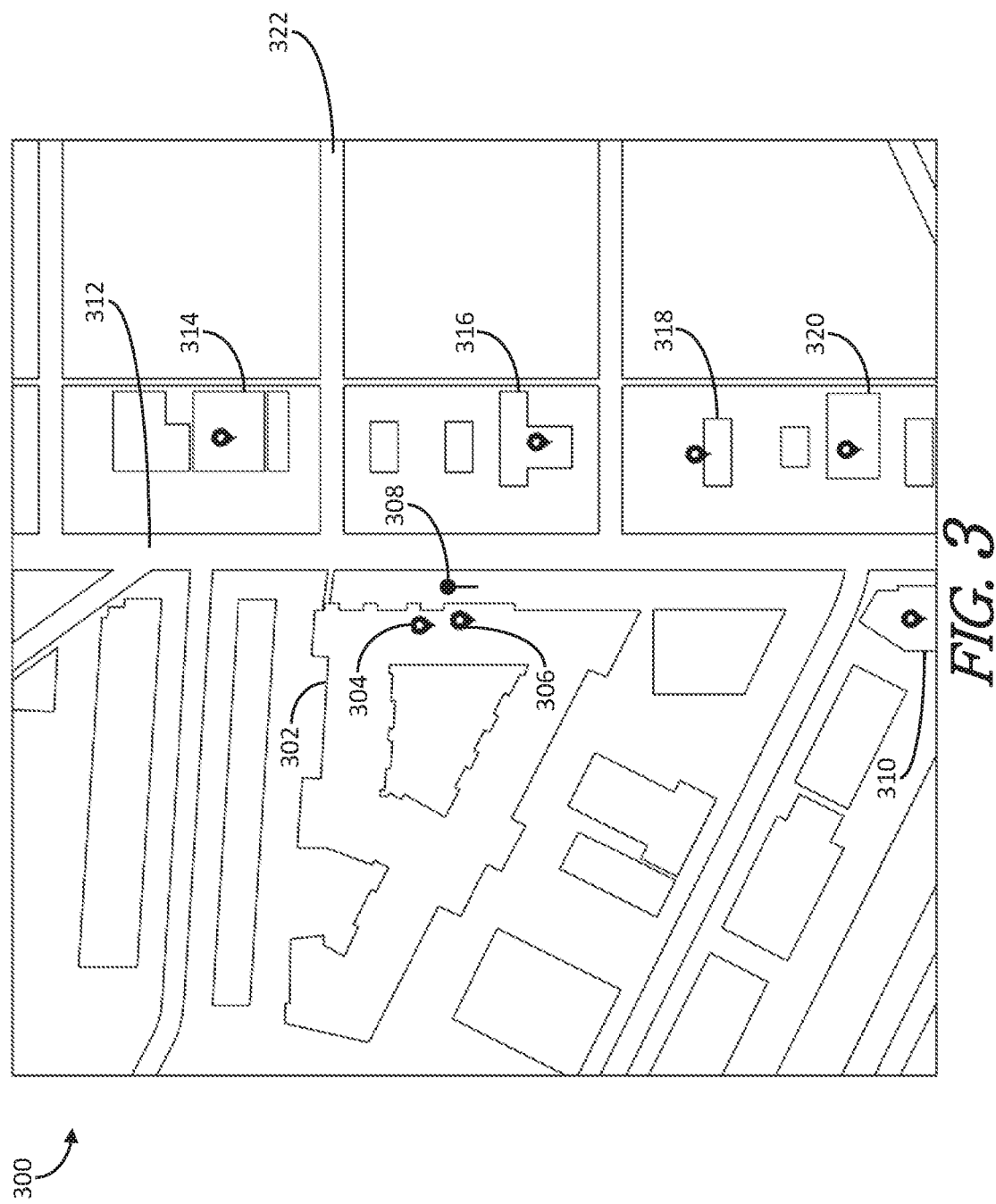
FIG. 3 depicts an example map of an example geographic area according to example embodiments of the present disclosure.

FIG. 3 depicts an example map of an example geographic area according to example embodiments of the present disclosure. Referring to FIG. 3, map 300 can depict a geographic region that includes location 308, where user device 102 can be located. The region can include travelways 312 and 322, as well as buildings 302, 310, 314, 316, 318, and 320. Buildings 302, 310, 314, 316, 318, and 320 can be associated with one or more organizations (e.g., occupants, owners, tenants, and/or the like). For example, building 302 can include portion 304 associated with an organization (e.g., THIP KHAO, and/or the like) and portion 306 associated with a different organization (e.g., allegro, and/or the like). The region depicted by map 300 can be part of a physical real-world environment (e.g., the world, and/or the like) in which user device 102 is located.

Figure 4:
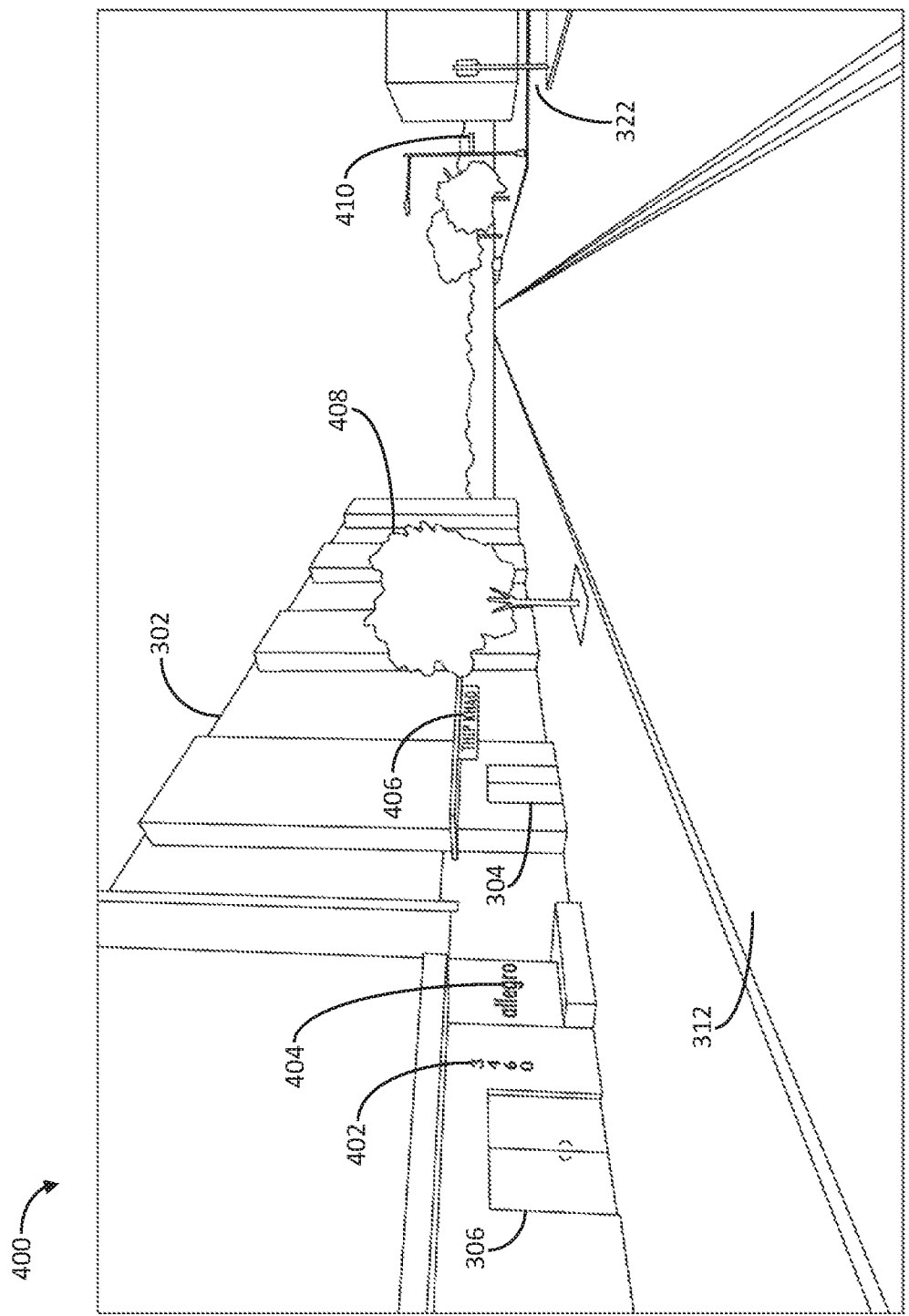
FIG. 4 depicts an example scene of a portion of an example physical real-world environment according to example embodiments of the present disclosure.

FIG. 4 depicts an example scene of a portion of an example physical real-world environment according to example embodiments of the present disclosure. Referring to FIG. 4, scene 400 can depict a portion of the physical real-world environment in which user device 102 is located (e.g., at location 308, and/or the like). For example, scene 400 can include portions of travelways 312 and 322 and portions 304 and 306 of building 302. Building 302 can include text 402 (e.g., a street address of building 302, and/or the like), portion 306 can include text 404 (e.g., a name of the organization associated with portion 306, and/or the like), and portion 304 can include text 406 (e.g., a name of the organization associated with portion 304, and/or the like). Scene 400 can also include objects 408 (e.g., a tree, and/or the like) and 410 (e.g., an artificial-light source, signage with text (not illustrated), such as a name of travelway 322, and/or the like).

Returning to FIG. 2, at (204), user device 102 can generate data representing imagery of at least a portion of the environment in which it is located. For example, user device 102 can include (e.g., store, execute, and/or the like) one or more applications configured to utilize data based at least in part on a geographic orientation of user device 102 (e.g., a geographic-mapping application, a geographic-navigation application, an augmented reality (AR) application, and/or the like); such application(s) can prompt a user of user device 102 to capture imagery from location 308; the user can utilize one or more of camera(s) 118 to capture such imagery; and camera(s) 118 can generate data representing imagery of a portion of the environment depicted by scene 400.

Figure 5:
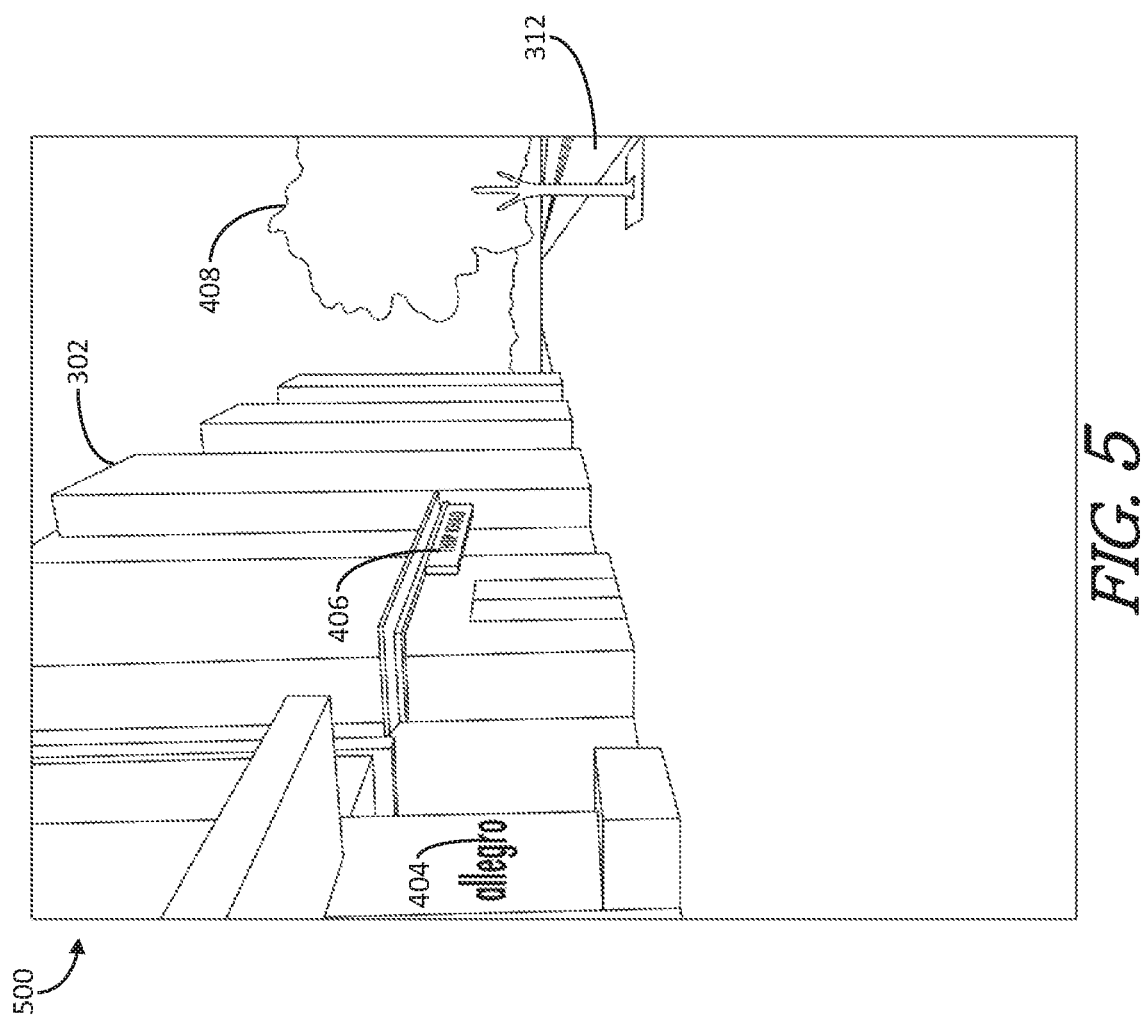
FIG. 5 depicts an example image of a portion of an example physical real-world environment according to example embodiments of the present disclosure.

FIG. 5 depicts an example image of a portion of an example physical real-world environment according to example embodiments of the present disclosure. Referring to FIG. 5, the data generated by camera(s) 118 can include data representing image 500, which, as illustrated, can include at least a portion of travelway 312, object 408, and building 302, including text 404 and 406.

Returning to FIG. 2, at (206), user device 102 can receive a request regarding its geographic orientation (e.g., for data based at least in part on its geographic orientation, and/or the like). For example, in some embodiments, the application(s) included on user device 102 can make such a request via an application programming interface (API), and/or the like.

At (208), user device 102 can communicate (e.g., via network(s) 104, as indicated by the cross-hatched box over the line extending downward from network(s) 104, and/or the like) data to computing system 106, which can receive the data. For example, such data can include data indicating the geographic location (e.g., location 308, and/or the like), orientation, and/or the like of user device 102 determined at (202), the data representing image 500, and/or the like.

At (210), user device 102 and/or computing system 106 can determine, based at least in part on the data representing image 500, one or more possible geographic orientations of camera(s) 118 (e.g., of camera(s) 118, user device 102, the user, and/or the like) with respect to travelway 312 (e.g., at location 308, and/or the like). For example, at (210A), user device 102 can determine the possible geographic orientation(s) (e.g., based at least in part on data indicating the geographic location (e.g., location 308, and/or the like), orientation, and/or the like of user device 102 determined at (202), the data representing image 500, and/or the like). Additionally or alternatively, at (210B), computing system 106 can determine the possible geographic orientation(s) (e.g., based at least in part on the data communicated at (208), and/or the like).

The possible geographic orientation(s) can be determined based at least in part on a machine-learning model (e.g., a neural network, and/or the like). For example, such a model can be configured (e.g., trained, optimized, and/or the like) to determine geographic orientations of cameras with respect to travelways, and user device 102 and/or computing system 106 can utilize the model to determine the possible geographic orientation(s) based at least in part on the data representing image 500, and/or the like (e.g., one or more positions, orientations, and/or the like of the portions of travelway 312, building 302, object 408, and/or the like within image 500, and/or the like).

In some embodiments, user device 102 and/or computing system 106 can select, for example, based at least in part on the geographic location determined at (202) (e.g., location 308, and/or the like), the machine-learning model from amongst multiple different machine-learning models for determining geographic orientations of cameras with respect to travelways. Such models can be based at least in part on training data comprising imagery from different corresponding geographic regions, and the selected model can be based at least in part on training data comprising imagery from the region depicted by map 300, and/or the like. In some of such embodiments, the imagery from the region depicted by map 300, and/or the like need not include imagery that comprises travelway 312.

In some embodiments, the machine-learning model can be based at least in part on training data cropped from panoramic imagery generated by a camera mounted on a vehicle. Such a vehicle can include one or more sensors (e.g., magnetometers, GPS receivers, and/or the like) for determining a geographic orientation of the camera mounted on the vehicle with respect to a travelway upon a portion of which the vehicle is traveling while the camera mounted on the vehicle captures the panoramic imagery, a physical real-world environment comprising the vehicle and the travelway upon the portion of which the vehicle is traveling, and/or the like. For each image of the images, such training data can include a geographic orientation of the image with respect to a travelway upon a portion of which the vehicle was traveling when the camera mounted on the vehicle captured panoramic imagery from which the image was cropped. For example, such a geographic orientation of the image can be determined based at least in part on data generated by the sensor(s) of the vehicle when the camera mounted on the vehicle captured the panoramic imagery from which the image was cropped.

Additionally or alternatively, the machine-learning model can be based at least in part on training data that includes imagery generated by one or more cameras carried by one or more users traveling (e.g., walking, and/or the like) along (e.g., in the middle of, alongside, and/or the like) one or more travelways (e.g., within the region depicted by map 300, and/or the like).

In some embodiments, prior to utilizing the machine-learning model to determine the possible geographic orientation(s), user device 102 and/or computing system 106 can crop, compress, resize, reorient, and/or the like image 500 in accordance with imagery included in the training data. In some embodiments, the machine-learning model can be configured to generate a probability map of the possible orientation(s), and/or the like. In some embodiments, the machine-learning model can be configured to determine the possible orientation(s) based at least in part on one or more geometries (e.g., expressed as one or more line equations, and/or the like) of one or more portions of one or more travelways included in the imagery, and/or the like. In some embodiments, each of the possible orientation(s) can be expressed as a four-dimensional quaternion, and/or the like. In some of such embodiments, the machine-learning model can determine, for each possible orientation, a four-dimensional log variance of the quaternion, and/or the like.

In some embodiments, the machine-learning model can comprise a convolutional neural network as the basis for a regression network, and/or the like. In some embodiments, the machine-learning model can comprise one or more fully connected layers, final regression layers, and/or the like (e.g., on top of the basis network, and/or the like).

In some embodiments, the machine-learning model can comprise an L2 loss function (e.g., on normalized quaternions, and/or the like). For example, the machine-learning model can comprise the following function:

$$\left\| \hat{q} - \frac{q}{\|q\|} \right\|_2$$

wherein: $\hat{q}$ can correspond to a ground truth unit quaternion (e.g., a four-dimensional vector, and/or the like); and q can correspond to a predicted quaternion, for example, not normalized, (e.g., a four-dimensional vector, and/or the like).

In some embodiments, the machine-learning model can comprise a confidence loss, for example, a Gaussian log likelihood that incorporates variance of predictions. For example, the machine-learning model can comprise the following function:

$$\left\| \frac{\hat{q} - \frac{q}{\|q\|}}{e^{0.5 \log v}} \right\|_2^2 + \sum \log v$$

wherein, log v can correspond to a predicted log variance of q (e.g., a four-dimensional vector, and/or the like).

Such loss can assume the ground truth lies on a normal distribution given the observed input and can attempt to predict the mean $$\frac{q}{\|q\|}$$

and log variance log v of such distribution, and/or the like. The normal distribution can be assumed to be axis-aligned isocontours (e.g., a diagonal covariance matrix with different diagonal elements, and/or the like).

In some embodiments, the possible geographic orientation(s) can include two orientations differing by one hundred and eighty degrees. For example, user device 102 and/or computing system 106 can determine camera(s) 118 are facing directly up or down travelway 312 (e.g., oriented at a zero-degree angle or one-hundred-eighty-degree angle with respect to travelway 312), perpendicular to travelway 312 one way or the other (e.g., oriented at a ninety-degree angle or two-hundred-seventy-degree angle with respect to travelway 312), askew to travelway 312 one way or the other (e.g., oriented at a forty-five-degree angle or two-hundred-twenty-five-degree angle with respect to travelway 312), and/or the like.

FIG. 6 depicts example orientations according to example embodiments of the present disclosure. Referring to FIG. 6, space 600 can represent a plane within the physical real-world environment in which user device 102 is located (e.g., at location 308, and/or the like). Space 600 can include reference orientation 608 of the environment (e.g., magnetic north, and/or the like). At location 308, travelway 312 can be at orientation 606 (e.g., offset by angle a from orientation 608, and/or the like). The determined possible orientation(s)

can include orientations 602 (e.g., offset by angle b from orientation 606, angle c from orientation 608, and/or the like) and 604 (e.g., offset by 180° from orientation 602, angle b plus 180° from orientation 606, and angle c plus 180° from orientation 608, and/or the like). In determining the possible orientations, user device 102 and/or computing system 106 can determine (e.g., based at least in part on one or more positions, orientations, and/or the like of the portions of travelway 312, building 302, object 408, and/or the like within image 500, and/or the like) orientations 602 and/or 604 based at least in part on an offset (e.g., angle b, angle b plus 180°, and/or the like) of travelway 312 within image 500, for example, with respect to camera(s) 118 (e.g., a center line of image 500, and/or the like).

Returning to FIG. 2, at (212), user device 102 and/or computing system 106 can select an orientation of camera(s) 118 with respect to travelway 312 from amongst the possible orientation(s). For example, at (212A), user device 102 can select (e.g., based at least in part on data indicating the geographic location (e.g., location 308, and/or the like), orientation, and/or the like of user device 102 determined at (202), the data representing image 500, and/or the like) orientation 602 from amongst orientations 602 and 604. Additionally or alternatively, at (212B), computing system 106 can select (e.g., based at least in part on the data communicated at (208), and/or the like) orientation 602 from amongst orientations 602 and 604.

In some embodiments, the orientation can be selected from amongst the possible orientation(s) based at least in part on the orientation of user device 102 determined at (202). As indicated above, it will be appreciated that the orientation of user device 102 determined at (202) can be inaccurate, imprecise, erroneous, and/or the like (e.g., unreliable for determining an accurate orientation of user device 102, and/or the like). It will further be appreciated, however, that despite its shortcomings, the orientation of user device 102 determined at (202) can be useful in accurately selecting an orientation of camera(s) 118 with respect to travelway 312 from amongst the possible orientation(s) (e.g., for selecting from amongst orientations 602 and 604, and/or the like).

In some embodiments, user device 102 and/or computing system 106 can select the orientation based at least in part on illumination variance in image 500. For example, user device 102 and/or computing system 106 can determine (e.g., based at least in part on illumination variance in image 500, and/or the like) a position of a light source, for example, an artificial-light source (e.g., object 410, and/or the like), the sun, the moon, and/or the like in the environment with respect to camera(s) 118; an orientation of the light source with respect to travelway 312 can be known, predetermined, determined by user device 102 and/or computing system 106, and/or the like; and user device 102 and/or computing system 106 can select the orientation based at least in part on the position of the light source with respect to camera(s) 118, the orientation of the light source with respect to travelway 312, and/or the like. In some of such embodiments, user device 102 and/or computing system 106 can select the orientation based at least in part on a time at which camera(s) 118 generated the data representing image 500. For example, such data can include a timestamp indicating a time at which camera(s) 118 generated the data representing image 500, and user device 102 and/or computing system 106 can determine the orientation of the light source with respect to travelway 312 based at least in part on the time at which camera(s) 118 generated the data representing image 500, and/or the like.

In some embodiments, user device 102 and/or computing system 106 can identify, in image 500, at least a portion of a building, different travelway, and/or the like. In some of such embodiments, user device 102 and/or computing system 106 can select the orientation based at least in part on the at least a portion of the building, different travelway, and/or the like. For example, user device 102 and/or computing system 106 can determine (e.g., based at least in part on image 500, and/or the like) a position of the portion of building 302 in image 500, and/or the like with respect to camera(s) 118; an orientation of the portion of building 302, and/or the like with respect to travelway 312 can be known, predetermined, determined by user device 102 and/or computing system 106, and/or the like; and user device 102 and/or computing system 106 can select the orientation based at least in part on the position of the portion of building 302, and/or the like with respect to camera(s) 118, the orientation of the portion of building 302, and/or the like with respect to travelway 312, and/or the like. It will be appreciated, for example, that had image 500 included one or more portions of buildings 310, 314, 316, 318, and/or 320, travelway 322, and/or the like, user device 102 and/or computing system 106 could select a different orientation.

In some embodiments, user device 102 and/or computing system 106 can recognize, in image 500, text associated with the at least a portion of the building, different travelway, and/or the like. For example, signage on building 302 can include text 402 indicating the street address of building 302, text 404 indicting the name of the organization associated portion 306, text 406 indicting the name of the organization associated portion 304, and/or the like. Similarly, object 410 can include signage with text (not illustrated) indicating the name of travelway 322, and/or the like. In some of such embodiments, user device 102 and/or computing system 106 can identify the at least a portion of the building, different travelway, and/or the like based at least in part on the recognized text. For example, user device 102 and/or computing system 106 can store, access, and/or the like a database including information indicating street addresses of buildings (e.g., the street address of building 302, and/or the like), street addresses of organizations (e.g., street addresses of the organizations associated with portions 304 and 306, and/or the like), organization names (e.g., the names of the organizations associated with portions 304 and 306, and/or the like), travelway names (e.g., the name of travelway 322, and/or the like), and/or associations between one or more portions of the information (e.g., associations between the street addresses of the organizations associated with portions 304 and 306 and the names of the organizations associated with portions 304 and 306, and/or the like); and user device 102 and/or computing system 106 can identify portions 304 and/or 306, travelway 322, and/or the like based at least in part on identifying one or more entries in the database that include at least a portion of the recognized text (e.g., text 404 and 406, the text included on the signage of object 410, and/or the like).

At (214), user device 102 and/or computing system 106 can determine (e.g., based at least in part on the selected orientation, and/or the like) a geographic orientation of camera(s) 118 (e.g., of camera(s) 118, user device 102, the user, and/or the like) with respect to the physical real-world environment (e.g., with respect to orientation 608, and/or the like). For example, at (214A), user device 102 can determine (e.g., based at least in part on the orientation of camera(s) 118 (e.g., orientation 602, and/or the like) with respect to travelway 312 (e.g., with respect to orientation 606, and/or the like), data indicating the geographic location (e.g., location 308, and/or the like), orientation, and/or the like of user device 102 determined at (202), the data representing image 500, and/or the like) a geographic orientation of camera(s) 118 (e.g., orientation 602, and/or the like) with respect to the environment (e.g., with respect to orientation 608, and/or the like). Additionally or alternatively, at (214B), computing system 106 can determine (e.g., based at least in part on the orientation of camera(s) 118 (e.g., orientation 602, and/or the like) with respect to travelway 312 (e.g., with respect to orientation 606, and/or the like), the data communicated at (208), and/or the like) a geographic orientation of camera(s) 118 (e.g., orientation 602, and/or the like) with respect to the environment (e.g., with respect to orientation 608, and/or the like).

In some embodiments determining the geographic orientation of camera(s) 118 with respect to the environment can include determining a geographic orientation of travelway 312 (e.g., orientation 606, and/or the like) with respect to the environment (e.g., with respect to orientation 608, and/or the like). For example, user device 102 and/or computing system 106 can identify (e.g., based at least in part on map 300, location 308, and/or the like) travelway 312; an orientation of travelway 312 (e.g., orientation 606, and/or the like) with respect to the environment (e.g., with respect to orientation 608, and/or the like) can be (e.g., based at least in part on map 300, location 308, and/or the like) known, predetermined, determined by user device 102 and/or computing system 106, and/or the like; and user device 102 and/or computing system 106 can determine an orientation of camera(s) 118 (e.g., orientation 602, and/or the like) with respect to the environment (e.g., with respect to orientation 608, and/or the like) based at least in part on the orientation of travelway 312 (e.g., orientation 606, and/or the like) with respect to the environment (e.g., with respect to orientation 608, and/or the like) and the orientation of camera(s) 118 (e.g., orientation 602, and/or the like) with respect to travelway 312 (e.g., with respect to orientation 606, and/or the like), for example, by combining an offset (e.g., angle a, and/or the like) of the orientation of travelway 312 (e.g., orientation 606, and/or the like) with respect to the environment (e.g., with respect to orientation 608, and/or the like) with an offset (e.g., angle b, and/or the like) of the orientation of camera(s) 118 (e.g., orientation 602, and/or the like) with respect to travelway 312 (e.g., with respect to orientation 606, and/or the like) to determine an offset (e.g., angle c, and/or the like) of the orientation of camera(s) 118 (e.g., orientation 602, and/or the like) with respect to the environment (e.g., with respect to orientation 608, and/or the like).

At (216), computing system 106 can communicate data to user device 102, which can receive the data. For example, such data can indicate the orientation of camera(s) 118 (e.g., orientation 602, and/or the like) with respect to travelway 312 (e.g., with respect to orientation 606, and/or the like) and/or the orientation of camera(s) 118 with respect to the environment (e.g., with respect to orientation 608, and/or the like).

At (218), user device 102 can communicate (e.g., return, and/or the like) data based at least in part on the orientation of camera(s) 118 (e.g., orientation 602, and/or the like) with respect to travelway 312 (e.g., with respect to orientation 606, and/or the like) and/or the orientation of camera(s) 118 with respect to the environment (e.g., with respect to orientation 608, and/or the like).

FIG. 7 depicts an example method according to example embodiments of the present disclosure. Referring to FIG. 7, at (702), a computing system can receive data generated by a camera and representing imagery that includes at least a portion of a physical real-world environment comprising the camera and a travelway. For example, user device 102 and/or computing system 106 can receive data generated by camera(s) 118 and representing image 500.

At (704), the computing system can determine, based at least in part on the data and a machine-learning model, a geographic orientation of the camera with respect to the travelway. For example, user device 102 and/or computing system 106 can determine, based at least in part on the data representing image 500 and a machine-learning model, a geographic orientation of camera(s) 118 (e.g., orientation 602, and/or the like) with respect to travelway 312 (e.g., with respect to orientation 606, and/or the like).

At (706), the computing system can determine a geographic orientation of the travelway with respect to a physical real-world environment including the camera and the travelway. For example, user device 102 and/or computing system 106 can determine a geographic orientation of travelway 312 (e.g., orientation 606, and/or the like) with respect to the physical real-world environment including the portion depicted by scene 400 (e.g., with respect to orientation 608, and/or the like).

At (708), the computing system can determine, based at least in part on the geographic orientation of the camera with respect to the travelway and the geographic orientation of the travelway with respect to the physical real-world environment, a geographic orientation of the camera with respect to the physical real-world environment. For example, user device 102 and/or computing system 106 can determine, based at least in part on the geographic orientation of camera(s) 118 (e.g., orientation 602, and/or the like) with respect to travelway 312 (e.g., orientation 606, and/or the like) and the geographic orientation of travelway 312 (e.g., orientation 606, and/or the like) with respect to the physical real-world environment including the portion depicted by scene 400 (e.g., with respect to orientation 608, and/or the like), a geographic orientation of camera(s) 118 (e.g., orientation 602, and/or the like) with respect to the physical real-world environment including the portion depicted by scene 400 (e.g., with respect to orientation 608, and/or the like).

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method comprising:
   receiving, by a computing system, data generated by a camera and representing imagery that includes at least a portion of a physical real-world environment comprising the camera and a travelway;
   estimating a position of a light source based on a time of day associated with the imagery;
   and
   determining, by the computing system, a geographic orientation of the camera with respect to the travelway, wherein the geographic orientation of the camera with respect to the travelway further comprises:
   determining a geographic location of the camera; and
   selecting, based at least in part on the geographic location of the camera, a machine-learning model from amongst a plurality of different machine-learning models for determining geographic orientations of cameras with respect to travelways, the plurality of different machine-learning models being based at least in part on training data comprising imagery from different corresponding geographic regions, the machine-learning model being based at least in part on training data comprising imagery from a geographic region comprising the geographic location of the camera, the imagery from the geographic region not including imagery that comprises the travelway.

2. The computer-implemented method of claim 1, comprising:
   determining, by the computing system, a geographic orientation of the travelway with respect to the physical real-world environment; and
   determining, by the computing system and based at least in part on the geographic orientation of the camera with respect to the travelway and the geographic orientation of the travelway with respect to the physical real-world environment, a geographic orientation of the camera with respect to the physical real-world environment.

3. The computer-implemented method of claim 1, wherein determining the geographic orientation of the camera with respect to the travelway comprises:
   determining, based at least in part on a machine-learning model, two possible geographic orientations of the camera with respect to the travelway, the two possible geographic orientations differing by one hundred and eighty degrees; and
   selecting, from amongst the two possible geographic orientations, the geographic orientation of the camera with respect to the travelway.

4. The computer-implemented method of claim 3, wherein selecting the geographic orientation of the camera with respect to the travelway comprises:
   identifying, in the imagery, one or more of at least a portion of a building or at least a portion of a different travelway; and
   selecting the geographic orientation of the camera with respect to the travelway based at least in part on the one or more of the at least a portion of the building or the at least a portion of the different travelway.

5. The computer-implemented method of claim 4, wherein identifying the one or more of the at least a portion of the building or the at least a portion of the different travelway comprises:
   recognizing, in the imagery, text associated with the one or more of the at least a portion of the building or the at least a portion of the different travelway; and
   identifying, based at least in part on the text, the one or more of the at least a portion of the building or the at least a portion of the different travelway.

6. The computer-implemented method of claim 3, wherein:
a user device comprises the camera;
the user device comprises one or more of a global positioning system (GPS) receiver, a magnetometer, or a wireless-network interface; and
selecting the geographic orientation of the camera with respect to the travelway comprises:
determining, based at least in part on data generated by the one or more of the GPS receiver, the magnetometer, or the wireless-network interface, a geographic orientation of the user device with respect to the physical real-world environment; and
selecting the geographic orientation of the camera with respect to the travelway based at least in part on the geographic orientation of the user device with respect to the physical real-world environment.

7. The computer-implemented method of claim 1, wherein a machine-learning model is based at least in part on training data comprising:
a plurality of images cropped from panoramic imagery generated by a camera mounted on a vehicle that includes one or more sensors for determining a geographic orientation of the camera mounted on the vehicle with respect to one or more of: a travelway upon a portion of which the vehicle is traveling while the camera mounted on the vehicle captures the panoramic imagery, or a physical real-world environment comprising the vehicle and the travelway upon the portion of which the vehicle is traveling; and
for each image of the plurality of images, a geographic orientation of the image with respect to a travelway upon a portion of which the vehicle was traveling when the camera mounted on the vehicle captured panoramic imagery from which the image was cropped, the geographic orientation of the image being determined based at least in part on data generated by the one or more sensors when the camera mounted on the vehicle captured the panoramic imagery from which the image was cropped.

8. The computer-implemented method of claim 1, comprising communicating, by the computing system, data based at least in part on the geographic orientation to one or more of a geographic-mapping application or a geographic-navigation application.

9. The computer-implemented method of claim 1, comprising communicating, by the computing system, data based at least in part on the geographic orientation to an augmented reality (AR) application.

10. The computer-implemented method of claim 1, wherein:
a user device comprises the camera;
receiving the data comprises receiving, locally, by the user device and from the camera, the data; and
determining the geographic orientation comprises determining, locally, by the user device, the geographic orientation.

11. The computer-implemented method of claim 1, wherein:
a user device comprises the camera;
receiving the data comprises, receiving by a computing system remotely located from the user device and via one or more networks that interface the user device and the computing system remotely located from the user device, the data; and
determining the geographic orientation comprises determining, by the computing system remotely located from the user device, the geographic orientation.

12. A system comprising:
one or more processors; and
a memory storing instructions that when executed by the one or more processors cause the system to perform operations comprising:
receiving data generated by a camera and representing imagery that includes at least a portion of a physical real-world environment comprising the camera and a travelway;
estimating a position of a light source based on a time of day associated with the imagery;
determining a geographic orientation of the camera with respect to the travelway, wherein the geographic orientation of the camera with respect to the travelway further comprises:
determining a geographic location of the camera; and
selecting, based at least in part on the geographic location of the camera, a machine-learning model from amongst a plurality of different machine-learning models for determining geographic orientations of cameras with respect to travelways, the plurality of different machine-learning models being based at least in part on training data comprising imagery from different corresponding geographic regions, the machine-learning model being based at least in part on training data comprising imagery from a geographic region comprising the geographic location of the camera, the imagery from the geographic region not including imagery that comprises the travelway.

13. The system of claim 12, wherein the operations comprise:
determining a geographic orientation of the travelway with respect to the physical real-world environment; and
determining, based at least in part on the geographic orientation of the camera with respect to the travelway and the geographic orientation of the travelway with respect to the physical real-world environment, a geographic orientation of the camera with respect to the physical real-world environment.

14. One or more non-transitory computer-readable media comprising instructions that when executed by one or more computers cause the one or more computers to perform operations comprising:
receiving data generated by a camera and representing imagery that includes at least a portion of a physical real-world environment comprising the camera and a travelway having a known orientation with respect to the physical real-world environment;
estimating a position of a light source based on a time of day associated with the imagery;
determining a geographic orientation of the camera with respect to the travelway, wherein the geographic orientation of the camera with respect to the travelway further comprises:
determining a geographic location of the camera; and
selecting, based at least in part on the geographic location of the camera, a machine-learning model from amongst a plurality of different machine-learning models for determining geographic orientations of cameras with respect to travelways, the plurality of different machine-learning models being based at least in part on training data comprising imagery from different corresponding geographic regions, the machine-learning model being based at least in part on training data comprising imagery from a geographic region comprising the geographic location of the camera, the imagery from the geographic region not including imagery that comprises the travelway.

15. The one or more non-transitory computer-readable media of claim 14, wherein determining the geographic orientation of the camera with respect to the travelway comprises:
  determining, based at least in part on a machine-learning model, two possible geographic orientations of the camera with respect to the travelway, the two possible geographic orientations differing by one hundred and eighty degrees; and
  selecting, from amongst the two possible geographic orientations, the geographic orientation of the camera with respect to the travelway.

* * * * *